United States Patent
Watanabe et al.

(10) Patent No.: US 9,291,698 B2
(45) Date of Patent: Mar. 22, 2016

(54) WIRELESS COMMUNICATION DEVICE, WIRELESS COMMUNICATION METHOD, AND COMPUTER PROGRAM PRODUCT

(71) Applicant: KABUSHIKI KAISHA TOSHIBA, Minato-ku, Tokyo (JP)

(72) Inventors: Tomoki Watanabe, Kanagawa (JP); Tatsuo Kozakaya, Kanagawa (JP); Ryuzo Okada, Kanagawa (JP); Yoshihiro Oba, Kanagawa (JP); Mitsuru Kanda, Tokyo (JP); Seijiro Yoneyama, Kanagawa (JP); Yasuyuki Tanaka, Kanagawa (JP); Takaomi Murakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 309 days.

(21) Appl. No.: 14/074,050

(22) Filed: Nov. 7, 2013

(65) Prior Publication Data

US 2014/0139663 A1    May 22, 2014

(30) Foreign Application Priority Data

Nov. 20, 2012 (JP) ................. 2012-254643

(51) Int. Cl.
| | |
|---|---|
| *H04N 7/18* | (2006.01) |
| *G01S 5/00* | (2006.01) |
| *G01S 11/06* | (2006.01) |
| *G01S 13/04* | (2006.01) |
| *G01S 15/04* | (2006.01) |

(52) U.S. Cl.
CPC ............... *G01S 5/0072* (2013.01); *G01S 11/06* (2013.01); *G01S 13/04* (2013.01); *G01S 15/04* (2013.01)

(58) Field of Classification Search
None
See application file for complete search history.

(56) References Cited

U.S. PATENT DOCUMENTS

| | | | | |
|---|---|---|---|---|
| 2005/0073438 A1* | 4/2005 | Rodgers | ................. | G08G 1/161 340/944 |
| 2006/0012476 A1* | 1/2006 | Markhovsky | ........... | G01S 13/74 340/539.32 |
| 2008/0147261 A1* | 6/2008 | Ichinose | .............. | G01C 22/006 701/24 |

(Continued)

FOREIGN PATENT DOCUMENTS

| | | |
|---|---|---|
| JP | 2004-274174 | 9/2004 |
| JP | 2007-235895 | 9/2007 |
| JP | 2009-071564 | 4/2009 |

*Primary Examiner* — Tracy Li
(74) *Attorney, Agent, or Firm* — Amin, Turocy & Watson, LLP

(57) ABSTRACT

According to an embodiment, a wireless communication device includes a detector to detect a mobile object by referring to sensing information; a first communicating unit to communicate mobile object information, which is related to a detection result of the mobile object, with another wireless communication device; a first calculator to calculate a moving path of the mobile object between wireless communication devices by referring to the detection result of the mobile object and mobile object information received from the other wireless communication device; a second communicating unit to communicate movement information, which is related to the moving path of the mobile object, with the other wireless communication device; and a second calculator to calculate distances between wireless communication devices that are dependent on the number of times of movement in the moving path by referring to the calculated moving path and movement information received from the other wireless communication device.

11 Claims, 7 Drawing Sheets

(56) References Cited

U.S. PATENT DOCUMENTS

2011/0117903 A1* 5/2011 Bradley .............. H04M 1/6075
455/418

2011/0143779 A1* 6/2011 Rowe ..................... G06Q 30/02
455/456.3

2011/0320256 A1* 12/2011 Florucci ............. G06Q 30/0226
705/14.33

* cited by examiner

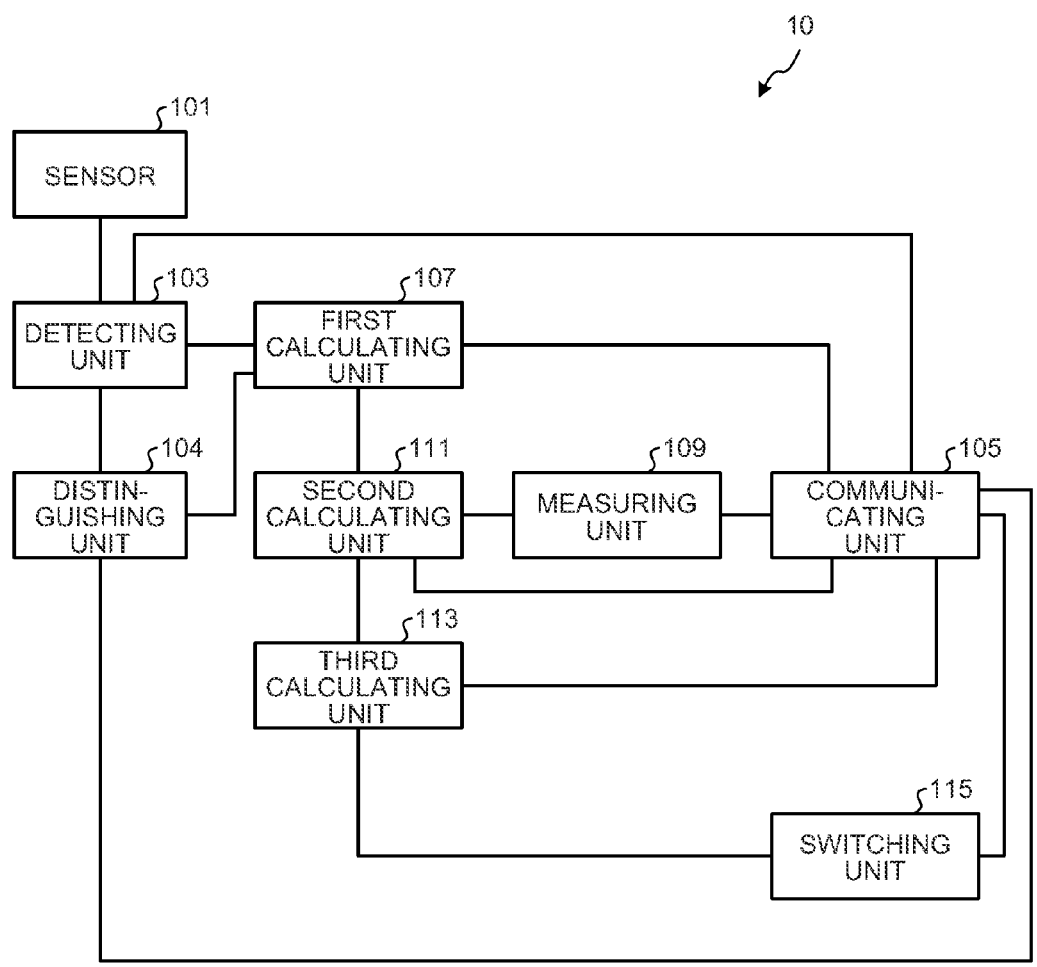

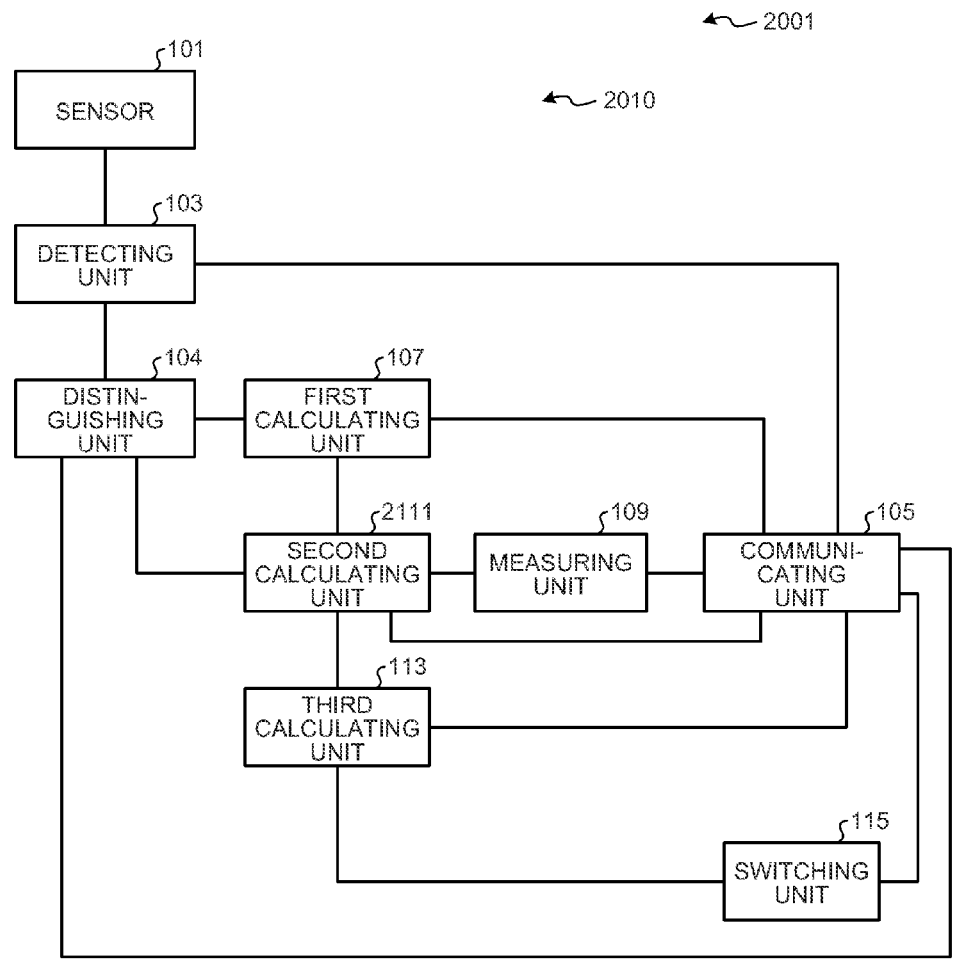

WIRELESS COMMUNICATION DEVICE, WIRELESS COMMUNICATION METHOD, AND COMPUTER PROGRAM PRODUCT

CROSS-REFERENCE TO RELATED APPLICATION(S)

This application is based upon and claims the benefit of priority from Japanese Patent Application No. 2012-254643, filed on Nov. 20, 2012; the entire contents of which are incorporated herein by reference.

FIELD

Embodiments described herein relate generally to a wireless communication device, a wireless communication method, and a computer program product.

BACKGROUND

A technology is known in which a transmission path within a wireless network is set by referring to the radio field intensity for communication among communication nodes and by referring to latitude-longitude information of the communication nodes.

However, in the conventional technology, since a transmission path is set by selecting the destination communication node according to the intensity of radio waves and the geographical proximity, it is not always true that a communication path suitable for performing efficient communication can be set.

BRIEF DESCRIPTION OF THE DRAWINGS

FIG. 2 is a configuration diagram illustrating an example of a wireless communication device according to the first embodiment;

FIG. 3 is a diagram illustrating a distance matrix that is calculated by a second calculating unit according to the first embodiment;

FIG. 7 is a configuration diagram illustrating an example of a wireless communication device according to a third embodiment;

FIG. 8 is a diagram illustrating an example of wireless communication devices that are divided in groups.

DETAILED DESCRIPTION

According to an embodiment, a wireless communication device includes a detector, a first communicating unit, a first calculator, a second communicating unit, and a second calculator. The detector is configured to detect a mobile object by referring to sensing information which is obtained by sensing a surrounding of the wireless communication device. The first communicating unit is configured to communicate mobile object information, which is related to a detection result of the mobile object, with another wireless communication device. The first calculator is configured to calculate a moving path of the mobile object between wireless communication devices including the wireless communication device by referring to the detection result of the mobile object and mobile object information received from the other wireless communication device. The second communicating unit is configured to communicate movement information, which is related to the moving path of the mobile object, with the other wireless communication device. The second calculator is configured to calculate distances between wireless communication devices that are dependent on the number of times of movement in the moving path by referring to the calculated moving path and movement information received from the other wireless communication device.

Various embodiments will be described below in detail with reference to the accompanying drawings. In the embodiments described below, the movement of a mobile object is sensed and a communication path between wireless communication devices is set based on the moving path of the mobile object.

First Embodiment

Figure 1:
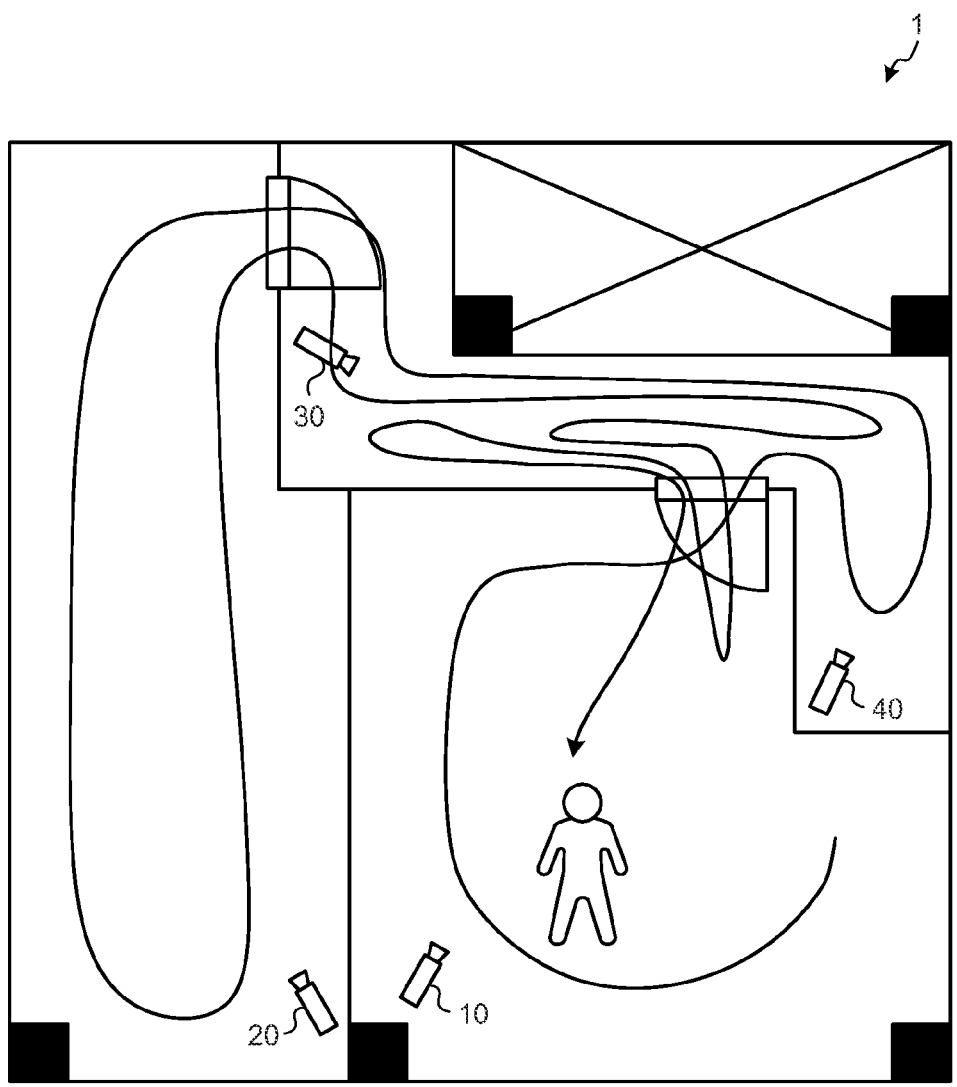
FIG. 1 is a schematic diagram illustrating an example of a wireless communication system according to a first embodiment.

FIG. 1 is a schematic diagram illustrating an example of a wireless communication system 1 according to a first embodiment. As illustrated in FIG. 1, the wireless communication system 1 includes wireless communication devices 10, 20, 30, and 40 that are installed at a venue. Herein, the venue can be an indoor venue such as an office building, a commercial building, or an indoor event site; or can be an outdoor venue such as an outdoor event site.

In the first embodiment, each wireless communication device is equipped with a sensor for sensing a mobile object (user) that moves around at the venue, and sets a communication path between the wireless communication devices based on the number of times of movement of the mobile object along the moving path.

The following explanation is given with the focus on the configuration of the wireless communication device 10. Regarding the other wireless communication devices 20, 30, and 40; it is assumed that the configurations are identical to the wireless communication device 10 unless otherwise noted.

FIG. 2 is a configuration diagram illustrating an example of the wireless communication device 10 according to the first embodiment. As illustrated in FIG. 2, the wireless communication device 10 includes a sensor 101, a detecting unit 103, a distinguishing unit 104, a communicating unit 105, a first calculating unit 107, a measuring unit 109, a second calculating unit 111, a third calculating unit 113, and a switching unit 115. As far as the other wireless communication devices 20, 30, and 40 are concerned; the second calculating unit 111, the third calculating unit 113, and the switching unit 115 may not be disposed.

The sensor 101 is capable of performing mobile object sensing. For example, the sensor 101 can be implemented using an image sensor (a camera) that captures images in visible light, or can be implemented using an infrared sensor (an infrared camera) that captures images at dark places; or can be implemented using a far-infrared sensor that captures images of far-infrared rays radiating from a high-temperature object; or can be implemented using a sonar device or a laser radar that detects an object from the reflection of sound waves or laser; or can be implemented using radio frequency identification (RFID) or an antenna that senses radio waves of cellular phones; or can be implemented using a combination of the abovementioned sensors. The following explanation is given for an example in which the sensor 101 is an image sensor that captures images in visible light. However, that is not the only possible case.

Meanwhile, the detecting unit 103, the distinguishing unit 104, the first calculating unit 107, the measuring unit 109, the second calculating unit 111, the third calculating unit 113, and the switching unit 115 can be implemented by running computer programs in a processing unit such as a central processing unit (CPU), that is, can be implemented using software; or can be implemented using hardware such as an integrated circuit (IC); or can be implemented using a combination of software and hardware. The communicating unit 105 can be implemented using a communication interface for wireless communication.

The sensor 101 performs sensing of the surrounding of the wireless communication device 10 and obtains sensing information.

The detecting unit 103 detects mobile objects that move around the wireless communication device 10 by referring to the sensing information, which is the result of sensing performed by the sensor 101. In the first embodiment, since the sensing information is in the form of images captured by the image sensors, the detecting unit 103 makes use of, for example, the technology disclosed in the following literature for detecting the presence or absence of mobile objects from the images.

Tomoki Watanabe, Satoshi Ito and Kentaro Yokoi: "Co-occurrence Histograms of Oriented Gradients for Human Detection", IPSJ Transactions on Computer Vision and Applications, Vol. 2, pp. 39-47. (2010).

Meanwhile, if the sensor 101 is a sonar device or a laser radar, then the detecting unit 103 detects mobile objects from the time-series behavior. Alternatively, if the sensor 101 is an antenna, then the detecting unit 103 detects the presence or absence of mobile objects or detects the distances to mobile objects according to the radio field intensity, or detects mobile objects by means of triangulation using an antenna array.

The distinguishing unit 104 distinguishes the mobile objects detected by the detecting unit 103 and issues mobile object IDs for those mobile objects. For example, when a mobile object is a person, the distinguishing unit 104 performs face matching for the person to identify the person and issues a mobile object ID for the person. Alternatively, for example, when a mobile object is a vehicle, the distinguishing unit 104 identifies the number written on the license plate of the vehicle and accordingly issues a mobile object ID for the vehicle. Meanwhile, if the sensor 101 is an antenna, then the distinguishing unit 104 issues mobile object IDs for solid bodies in possession of mobile objects. Meanwhile, in the case when only a single mobile object is present, then the distinguishing unit 104 may not be disposed.

The communicating unit 105 (an example of a first communicating unit to a third communicating unit) performs wireless communication with other wireless communication devices such as the wireless communication devices 20, 30, and 40 that are installed around the wireless communication device 10; and sends and receives mobile object information regarding the detection result of mobile objects, movement information regarding the moving paths of mobile objects, and radio field intensity information regarding the radio field intensity.

More particularly, to other wireless communication devices, the communicating unit 105 sends mobile object information that contains the mobile object IDs of the mobile objects detected by the detecting unit 103, the detection timings of detecting those mobile objects, and the node ID of the wireless communication device 10. Moreover, the communicating unit 105 such mobile object information from other wireless communication devices. Meanwhile, in the case when only a single mobile object is present, the mobile object ID can be omitted from the mobile object information.

Furthermore, to the other wireless communication devices, the communicating unit 105 sends movement information containing the moving paths calculated by the first calculating unit 107 (described later) and sends radio field intensity information containing the radio field intensity measured by the measuring unit 109 (described later). Moreover, the communicating unit 105 receives such movement information and such radio field intensity information from other the wireless communication devices.

When a mobile object is detected by the detecting unit 103, the first calculating unit 107 determines the wireless communication device that had previously detected the same mobile object by referring to the mobile object information received by the communicating unit 105 from the other wireless communication devices, to thereby obtain the moving path of the mobile object.

More particularly, the first calculating unit 107 retrieves, from the mobile object information received from the other wireless communication devices, the mobile object information containing the mobile object ID of the mobile object detected by the detecting unit 103 and containing the latest detection timing (that is closest to the current time). If the mobile object ID is omitted from the mobile object information, then the first calculating unit 107 can retrieve, from the mobile object information received from the other wireless communication devices, the mobile object information containing the latest detection timing (that is closest to the current time). Then, the first calculating unit 107 determines that the mobile object has moved from the surrounding of the wireless communication device that corresponds to the node ID specified in the retrieved mobile object information to the wireless communication device 10, to thereby calculate the moving path of the mobile object.

The measuring unit 109 measures the radio field intensity of wireless communication performed with the other wireless communication devices.

The second calculating unit 111 calculates the distance between each pair of wireless communication devices by referring to: the moving path calculated by the first calculating unit 107; the radio field intensity measured by the measuring unit 109; and the movement information and the radio field intensity information received by the communicating unit 105 from the other wireless communication devices. Herein, the between each pair of wireless communication devices is dependent on the number of times of movement of the mobile object along the moving path.

More particularly, the second calculating unit 111 tallies up the moving path calculated by the first calculating unit 107 and the moving paths specified in the movement information received by the communicating unit 105 from the other wireless communication devices, and calculates the distances between the wireless communication devices in such a way that, greater the number of times of movement between particular wireless communication devices, the shorter is the distance between those wireless communication devices. Herein, the movement between two wireless communication devices is direct movement therebetween without going by way of any other wireless communication device.

Moreover, if a sufficient radio field intensity for establishing wireless communication between two wireless communication devices cannot be obtained by referring to the radio field intensity measured by the measuring unit 109 and the radio field intensity specified in the radio field intensity information received by the communicating unit 105 from the other wireless communication devices, then the second calculating unit 111 sets ∞ as the distance between those two wireless communication device.

For example, with reference to FIG. 1, the number of times of movement from the wireless communication device 10 to the wireless communication device 20 is zero; the number of times of movement from the wireless communication device 10 to the wireless communication device 30 is three; the number of times of movement from the wireless communication device 10 to the wireless communication device 40 is one; the number of times of movement from the wireless communication device 20 to the wireless communication device 30 is two; the number of times of movement from the wireless communication device 20 to the wireless communication device 40 is zero; and the number of times of movement from the wireless communication device 30 to the wireless communication device 40 is three. In that case, the second calculating unit 111 calculates, for example, a distance matrix as illustrated in FIG. 3. In the example illustrated in FIG. 3, greater the number of times of movement between two wireless communication devices, the shorter is the distance between those two wireless communication devices. Moreover, since a sufficient radio field intensity cannot be obtained between the wireless communication device 10 and the wireless communication device 20 as well as between the wireless communication device 20 and the wireless communication device 40, the respective distances are set to ∞.

Meanwhile, the second calculating unit 111 can obtain the distances according to the following criteria. Greater the number of times of movement between two wireless communication devices, the shorter is the distance between those two wireless communication devices; and weaker the radio field intensity between two wireless communication devices, the greater is the distance between those two wireless communication devices. In that case, the distance can be calculated as "(number of times of movement)+(1/(radio field intensity))". Herein, the number of times of movement and the radio field intensity can be weighted in an arbitrary manner.

Figure 4:
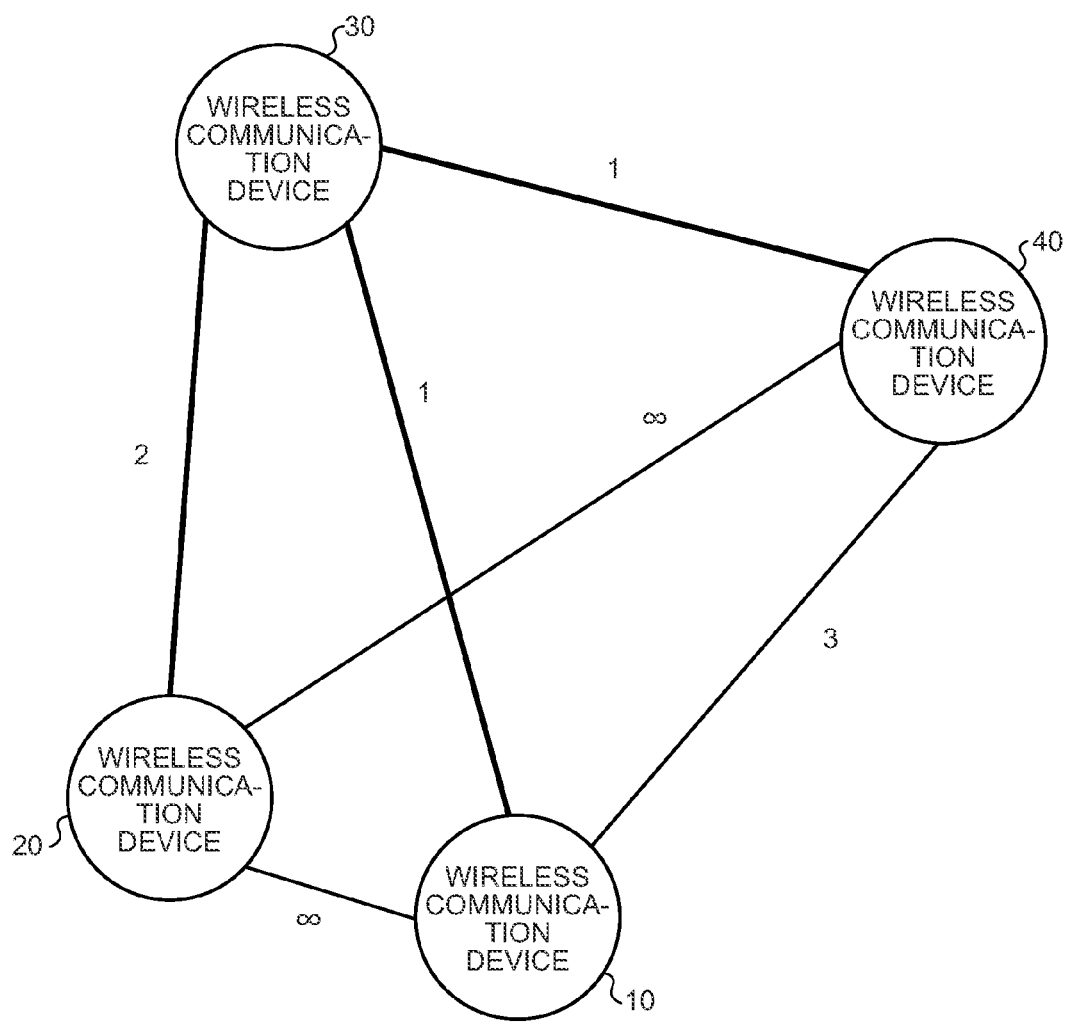
FIG. 4 is a diagram illustrating an optimal communication path that is calculated by the second calculating unit according to the first embodiment.

Based on the distances calculated by the second calculating unit 111; the third calculating unit 113 calculates an optimal communication path for the purpose of optimizing the communication among the wireless communication devices. More particularly, the third calculating unit 113 calculates an optimal communication path by connecting, on a priority basis, the wireless communication devices having shorter distances calculated by the second calculating unit 111. For example, with respect to a graph in which the wireless communication devices are considered nodes and the distances therebetween are considered edge weights, the third calculating unit 113 calculates a minimum spanning tree (MST); and sets the edges obtained as a result of MST calculation as the optimal communication path (see FIG. 4). In FIG. 4, circles represent the wireless communication devices; numbers written in between the wireless communication devices represent the distances; and heavy lines joining the wireless communication devices represent MST (optimal communication path).

Herein, the MST represents a graph in which the summation of weight is the smallest, and is calculated using expected linear time MST algorithm disclosed in Karger, David R.; Klein, Philip N.; Tarjan, Robert E. (1995), "A randomized linear-time algorithm to find minimum spanning trees", Journal of the Association for Computing Machinery 42 (2): 321-328.

Meanwhile, alternatively, the third calculating unit 113 can calculate the optimal communication path by implementing the edge selection algorithm of the existing wireless communication paths setting technique in which distances and radio field intensity obtained by the global positioning system (GPS) are put to use. Still alternatively, the third calculating unit 113 can calculate the optimal communication path by connecting, on a priority basis, the nodes having larger distances therebetween or by connecting, on a priority basis, the nodes having particular distances therebetween. This is because, depending on the communication objective, calculating the optimal communication path in any of the abovementioned ways is suitable for performing efficient communication.

The switching unit 115 switches the communication path of the wireless communication device 10 and the other wireless communication devices to the optimal communication path calculated by the third calculating unit 113.

Figure 5:
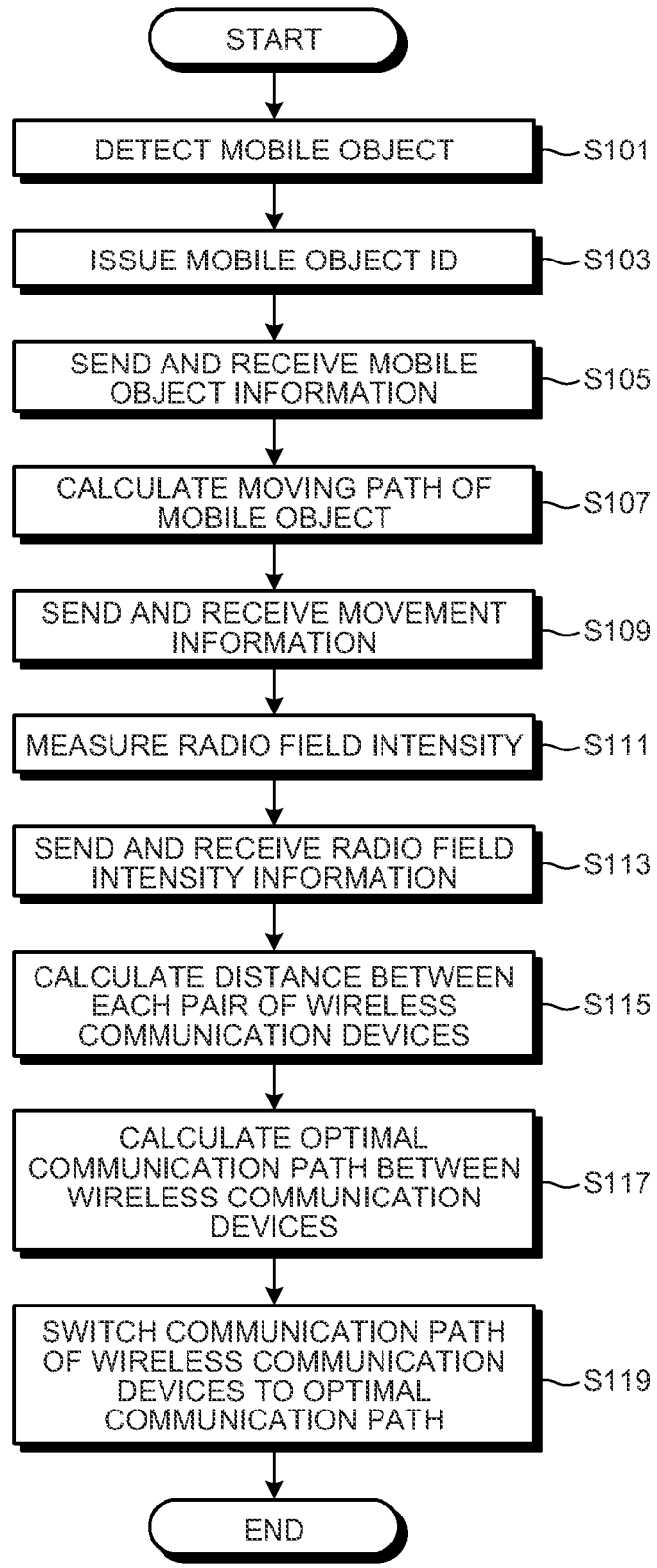
FIG. 5 is a flowchart for explaining an exemplary sequence of operations performed according to the first embodiment.

FIG. 5 is a flowchart for explaining an exemplary sequence of operations performed in the wireless communication device 10 according to the first embodiment.

Firstly, the detecting unit 103 detects mobile objects from the images that are obtained as the sensing result of the sensor 101 (Step S101).

Then, the distinguishing unit 104 distinguishes the mobile objects detected by the detecting unit 103, and issues mobile object IDs (Step S103).

Subsequently, the communicating unit 105 sends mobile object information that contains the mobile object IDs of the mobile objects detected by the detecting unit 103, the detection timings of detecting those mobile objects, and the node ID of the wireless communication device 10 to the other wireless communication devices such as the wireless communication devices 20, 30, and 40 that are installed around the wireless communication device 10. Moreover, the communicating unit 105 receives such mobile object information from the other wireless communication devices (Step S105).

When a mobile object is detected by the detecting unit 103, the first calculating unit 107 determines the wireless communication device that had previously detected the same mobile object by referring to the mobile object information received by the communicating unit 105 from the other wireless communication devices, to thereby calculate the moving path of that mobile object (Step S107).

Then, the communicating unit 105 sends the movement information, which indicates the moving path calculated by the first calculating unit 107, to the other wireless communication devices. Moreover, the communicating unit 105 receives such movement information from the other wireless communication devices (Step S109).

Subsequently, the measuring unit 109 measures the radio field intensity of wireless communication performed with the other wireless communication devices (Step S111).

Then, the communicating unit 105 sends radio field intensity information, which indicates the radio field intensity measured by the measuring unit 109, to the other wireless communication devices. Moreover, the communicating unit 105 receives such radio field intensity information from the other wireless communication devices (Step S113).

Subsequently, the second calculating unit 111 calculates the distance between each pair of wireless communication devices by referring to the moving path calculated by the first calculating unit 107, the radio field intensity measured by the measuring unit 109, and the movement information and the radio field intensity information received by the communicating unit 105 from the other wireless communication devices (Step S115).

Then, the third calculating unit 113 calculates the optimal communication path by connecting, on a priority basis, the wireless communication devices having shorter distances calculated by the second calculating unit 111 (Step S117).

Subsequently, the switching unit 115 switches the communication path of the wireless communication device 10 and the other wireless communication devices to the optimal communication path calculated by the third calculating unit 113 (Step S119).

In this way, in the first embodiment, such paths between wireless communication devices that have obstacles, such as walls that affect the movement of mobile objects, are not set as the communication path. Hence, according to the first embodiment, it becomes possible to set a communication path that is suitable for performing efficient communication related to the information on mobile objects.

Second Embodiment

In a second embodiment, the explanation is given for an example of setting the communication path between wireless communication devices by taking into account the moving time of a mobile object. The following explanation is given with the focus on the differences with the first embodiment. Hence, in the second embodiment, the constituent elements having the same functions as those described in the first embodiment are referred to by the same names and the same reference numerals, and the explanation thereof is not repeated.

Figure 6:
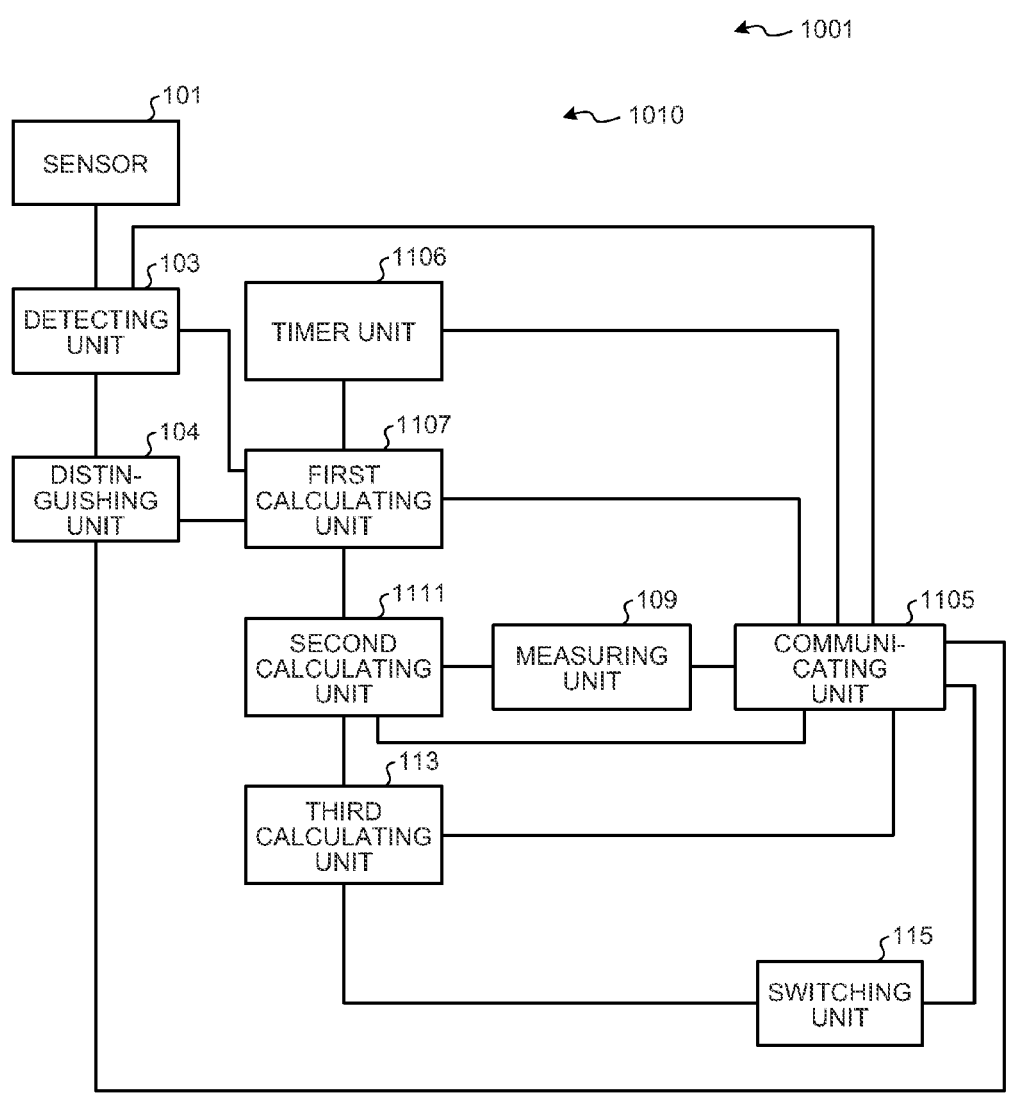
FIG. 6 is a configuration diagram illustrating an example of a wireless communication device according to a second embodiment.

FIG. 6 is a configuration diagram illustrating an example of a wireless communication device 1010 in a wireless communication system 1001 according to the second embodiment. As illustrated in FIG. 6, in the wireless communication device 1010 according to the second embodiment; a communicating unit 1105, a timer unit 1106, a first calculating unit 1107, and a second calculating unit 1111 are different as compared to the first embodiment.

The timer unit 1106 can be implemented by running a computer program in a processing unit such as a central processing unit (CPU), that is, can be implemented using software; or can be implemented using hardware such as an integrated circuit (IC); or can be implemented using a combination of software and hardware.

The timer unit 1106 measures time. For example, the timer unit 1106 controls time measurement using a crystal oscillator, and periodically perform fine adjustment of time measurement using the radio waves of an atomic clock or using the network time protocol (NTP). With that, it becomes possible to synchronize the time between the wireless communication device 1010 and the other wireless communication devices. Meanwhile, in the first embodiment too, the wireless communication device 10 can be configured to include the timer unit 1106.

The first calculating unit 1107 not only calculates the moving path of a mobile object but also calculates the moving time of that mobile object. More particularly, the first calculating unit 1107 calculates the moving time of a mobile object by referring to the timing at which the detecting unit 103 detected the mobile object and by referring to the detection timing specified in the retrieved mobile object information.

The communicating unit 1105 sends movement information, which indicates the moving path and the moving time calculated by the first calculating unit 1107, to the other wireless communication devices. Moreover, the communicating unit 1105 receives such movement information from the other wireless communication devices.

The second calculating unit 1111 calculates the distance between each pair of wireless communication devices by referring to the moving path and the moving time calculated by the first calculating unit 1107, the radio field intensity measured by the measuring unit 109, and the movement information and the radio field intensity information received by the communicating unit 105 from the other wireless communication devices.

More particularly, from the moving path calculated by the first calculating unit 1107 and the moving paths specified in movement path information that is received by the communicating unit 105 from the other wireless communication devices, the second calculating unit 1111 tallies up the moving paths having the moving time less than a first threshold value and calculates the distances between the wireless communication devices in such a way that, greater the number of times of movement between particular wireless communication devices, the shorter is the distance between those wireless communication devices.

In this way, in the second embodiment, since the movements having appropriate moving time are tallied up in the number of times of movement, it can be expected that irregular movements are not tallied up in the number of times of movement. Hence, it can be expected to achieve enhancement in the setting accuracy of the communication path. As a result, the communication path suitable for performing efficient communication can be set with accuracy.

Third Embodiment

In a third embodiment, the explanation is given about an example in which wireless communication devices are divided into groups; distances are calculated based on the groups; and accordingly the communication path between wireless communication devices is set. The following explanation is given with the focus on the differences with the first embodiment. Hence, in the third embodiment, the constituent elements having the same functions as those described in the first embodiment are referred to by the same names and the same reference numerals, and the explanation thereof is not repeated.

FIG. 7 is a configuration diagram illustrating an example of a wireless communication device 2010 in a wireless communication system 2001 according to the third embodiment. As illustrated in FIG. 7, in the wireless communication device 2010 according to the third embodiment; a second calculating unit 2111 is different as compared to the first embodiment.

The second calculating unit 2111 divides the wireless communication devise into groups by referring to the mobile object IDs issued by the distinguishing unit 104, the moving paths calculated by the first calculating unit 107, and the mobile object information and the movement information received by the communicating unit 105 from the other wireless communication devices; and calculates the distance between each pair of wireless communication devices.

More particularly, the second calculating unit 2111 tallies up the moving paths of a predetermined mobile object by referring to the mobile object IDs issued by the distinguishing unit 104, the moving paths calculated by the first calculating unit 107, and the movement information received by the communicating unit 105 from the other wireless communication devices; and sets such wireless communication devices between which the predetermined mobile object has moved for a predetermined number of times or more (an example of a second threshold value) in a single group. Meanwhile, the second calculating unit 2111 can set a single wireless communication device in a plurality of groups.

Then, the second calculating unit 2111 calculates the Hamming distances of values used in group setting as the distances to the wireless communication devices.

Figures 9, 10:
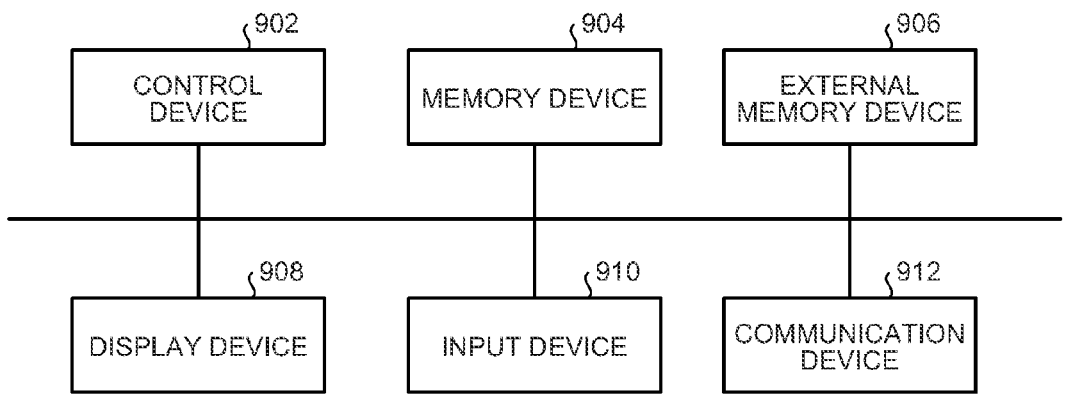
FIG. 9 is a diagram illustrating an example of wireless communication devices that are divided in groups.
FIG. 10 is a diagram illustrating an exemplary hardware configuration of the wireless communication device according to the embodiments and modification examples thereof.

FIGS. 8 and 9 are diagrams illustrating examples of the wireless communication devices that are divided into groups. FIG. 8 is a diagram illustrating an example in which a single wireless communication device is set in a single group. FIG. 9 is a diagram illustrating an example in which a single wireless communication device is set in a plurality of groups.

In the examples illustrated in FIGS. 8 and 9, when a wireless communication device satisfies a group setting condition with respect to a mobile object, "1" is set for that wireless communication device. In contrast, when a wireless communication device does not satisfy the group setting condition with respect to a mobile object, "0" is set for that wireless communication device. Then, for each mobile object, the wireless communication devices having "1" set therein set in the same group. For each wireless communication device, the values indicating whether or not the group setting condition is satisfied with respect to each mobile object serve as the Hamming distance. In the example illustrated in FIG. 9, since the wireless communication device having the node ID "10" belongs only to the group "2"; the values are "010". Since the wireless communication device having the node ID "20" belongs to the groups "2" and "3"; the values are "011". Since the wireless communication device having the node ID "30" belongs to the groups "1" and "3"; the values are "101". Since the wireless communication device having the node ID "40" belongs only to the group "1"; the values are "100". Regarding the wireless communication devices having the node IDs "10" and "20"; the Hamming distance therebetween is "1" because of the values "010" and "011". Regarding the wireless communication devices having the node IDs "10" and "30"; the Hamming distance therebetween is "3" because of the values "010" and "101". Regarding the wireless communication devices having the node IDs "10" and "40", the Hamming distance therebetween is "2" because of the values "010" and "100".

Meanwhile, in the third embodiment, the distinguishing unit 104 need not issue unique mobile object IDs to the mobile objects, and can issue the same mobile object ID to a plurality of mobile objects. For example, if a plurality of mobile objects is asked to walk around while carrying a panel having the room number or the floor number written thereon, then the distinguishing unit 104 can consider the characters or patterns written on the panel as the mobile object ID. Alternatively, if a plurality of mobile objects is asked to walk around while carrying an RFID to enable switching between radio waves representing the room numbers or the floor numbers, then the distinguishing unit 104 can consider the radio wave information as the mobile object ID.

In this way, in the third embodiment, the wireless communication devices are divided into groups; the Hamming distances of the grouped wireless communication devices are calculated as the distances between the wireless communication devices; and the accordingly communication path between the wireless communication devices is set. In the third embodiment, since it becomes possible for the mobile objects (users) to purposefully operate the groups, the intentions of the users can be reflected at the time of setting the communication path between the wireless communication devices.

Modification Examples

In each embodiment described above, the explanation is given about an example in which the wireless communication device 10, the wireless communication device 1010, or the wireless communication device 2010 calculates the distance between each pair of wireless communication devices; calculates the optimal communication path; and switches the communication path to the optimal communication path. However, that is not the only possible case. Alternatively, the abovementioned operations either can be performed by any of the wireless communication devices or can be performed by an external device such as a server device.

Moreover, in each embodiment described above, centralized processing is assumed to be the case. Hence, the wireless communication device 10, the wireless communication device 1010, or the wireless communication device 2010 calculates the distance between each pair of wireless communication devices and calculates the optimal communication path. However, decentralized processing can also be considered as an alternative. In that case, each wireless communication device can calculate the distances between the wireless communication devices with which it performs wireless communication, and can accordingly calculate the optimal communication path. With that, the optimal communication paths are calculated in a sequential manner.

In this case, a root node is set, and each wireless communication device repeatedly performs the operation of selecting a node having the shortest distance from a node linked to the root node, and establishing connection to the selected node. With that, the optimal communication path can be calculated. Herein, whether or not an adjacent node is linked to the root node can be known by communicating with that adjacent node. Meanwhile, as the root node is set a node that is connected to a gateway to other networks.

Moreover, in each embodiment described above, the explanation is given about an example in which each wireless communication device detects a mobile object and calculates the moving path of that mobile object. Then, one of the wireless communication devices calculates the distance between each pair of wireless communication devices; calculates the optimal communication path; and switches the communication path to the optimal communication path. However, alternatively, all of the abovementioned operations can be performed in an external device such as a server device.

In this case, the server device can be configured to be identical to the wireless communication device 10, the wireless communication device 1010, or the wireless communication device 2010. However, the sensor need not be disposed. Instead, the communicating unit can receive the sensing information from each wireless communication device. Moreover, the communicating unit need not send the mobile object information, the movement information, and the radio field intensity information.

Hardware Configuration

FIG. 10 is a diagram illustrating an exemplary hardware configuration of the wireless communication devices according to the embodiments and the modification examples thereof. Each wireless communication device according to the embodiments and the modification examples thereof has the hardware configuration of a commonplace computer that includes a control device 902 such as a central processing unit (CPU); a memory device 904 such as a read only memory (ROM) or a random access memory (RAM); an external memory device 906 such as a hard disk drive (HDD); a display device 908 such as a display; an input device 910 such as a keyboard or a mouse; and a communication device 912 for wireless communication.

The computer programs that are executed in each wireless communication device according to the embodiments and the modification examples thereof can be recorded in the form of installable or executable files in a computer-readable recording medium such as a compact disk read only memory (CD-ROM), a flexible disk (FD), a compact disk readable (CD-R), or a digital versatile disk (DVD).

Alternatively, the computer programs that are executed in each wireless communication device according to the embodiments and the modification examples thereof can be saved as downloadable files on a computer connected to the Internet or can be made available for distribution through a network such as the Internet. Still alternatively, the computer programs that are executed in each wireless communication device according to the embodiments and the modification examples thereof can be stored in advance in a ROM or the like.

Meanwhile, the computer programs that are executed in each wireless communication device according to the embodiments and the modification examples thereof contain a module for each of the abovementioned constituent elements to be implemented in a computer. In practice, for example, a CPU reads the computer programs from an HDD and runs them such that the computer programs are loaded in a RAM. As a result, the module for each of the abovementioned constituent elements is generated in the computer.

Unless contrary to the nature thereof, the steps of the flowcharts according to the embodiments described above can have a different execution sequence, can be executed in plurality at the same time, or can be executed in a different sequence every time.

As described above, according to the embodiments described above and the modification examples thereof, it becomes possible to set a communication path that is suitable for performing efficient communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device comprising:
   a detector configured to detect a mobile object by referring to sensing information which is obtained by sensing a surrounding of the wireless communication device;
   a first communicating unit configured to communicate mobile object information, which is related to a detection result of the mobile object, with another wireless communication device;
   a first calculator configured to calculate a moving path of the mobile object between wireless communication devices including the wireless communication device by referring to the detection result of the mobile object and mobile object information received from the other wireless communication device;
   a second communicating unit configured to communicate movement information, which is related to the moving path of the mobile object, with the other wireless communication device; and
   a second calculator configured to calculate distances between wireless communication devices that are dependent on the number of times of movement in the moving path by referring to the calculated moving path and movement information received from the other wireless communication device.

2. The device according to claim 1, wherein the second calculator calculates the distances in such a way that, greater the number of times of movement in the moving path, the smaller is the distance, by referring to the calculated moving path and the movement information received from the other wireless communication device.

3. The device according to claim 1, further comprising:
   a measuring unit configured to measure a radio field intensity of wireless communication performed with the other wireless communication device; and
   a third communicating unit configured to communicate radio field intensity information, which is related to the radio field intensity, to the other wireless communication device, wherein
   the second calculator calculates the distances in such a way that, weaker the radio field intensity of a moving path, the greater is the distance, by further referring to the calculated radio field intensity and radio field intensity information received from the other wireless communication device.

4. The device according to claim 1, further comprising:
   a third calculator configured to, based on the calculated distances, calculate an optimal communication path in which communication between wireless communication devices is optimized; and
   a switching unit configured to switch a communication path between wireless communication devices to the optimal communication path.

5. The device according to claim 4, wherein the optimal communication path is formed by connecting a communication path having a short distance between wireless communication devices performing communication with each other.

6. The device according to claim 1, wherein
   the first calculator further calculates a moving time in the moving path,
   the movement information is further related to the moving time, and
   the second calculator, by referring to the calculated moving path and the movement information received from the other wireless communication device, tallies up the moving paths having the moving time less than a first threshold value so as to calculate the distances.

7. The device according to claim 1, wherein the second calculator sets, in same group, the wireless communication device or the other wireless communication device present in a moving path in which the number of times of movement of same mobile object is equal to or greater than a second threshold value and calculates, as the distances, Hamming distances of values used in group setting.

8. The device according to claim 1, wherein the sensing information is an image.

9. A server device comprising:
   a communicating unit configured to, from each wireless communication device, receives sensing information obtained by sensing a surrounding of the each wireless communication device;
   a detector configured to detect a mobile object from each of a plurality of pieces of the sensing information;
   a first calculator configured to calculate a moving path of the mobile object between wireless communication devices by referring to a detection result of the mobile object; and
   a second calculator configured to calculate distances between wireless communication devices that are dependent on the number of times of movement in the moving path by referring to the calculated moving path.

10. A wireless communication method implemented in a wireless communication device, the method comprising:

detecting, by a detector, a mobile object by referring to sensing information which is obtained by sensing a surrounding of the wireless communication device;

communicating, by a first communicating unit, mobile object information, which is related to a detection result of the mobile object, with another wireless communication device;

calculating, by a first calculator, a moving path of the mobile object between wireless communication devices including the wireless communication device by referring to the detection result of the mobile object and mobile object information received from the other wireless communication device;

communicating, by a second communicating unit, movement information, which is related to the moving path of the mobile object, with the other wireless communication device; and calculating, by a second calculator, calculating distances between wireless communication devices that are dependent on the number of times of movement in the moving path by referring to the calculated moving path and movement information received from the other wireless communication device.

11. A computer program product comprising a computer readable medium including a computer program, wherein the program, when executed by a computer of a wireless communication device, causes the computer to perform:

detecting a mobile object by referring to sensing information which is obtained by sensing a surrounding of the wireless communication device;

communicating mobile object information, which is related to a detection result of the mobile object, with another wireless communication device;

calculating a moving path of the mobile object between wireless communication devices including the wireless communication device by referring to the detection result of the mobile object and mobile object information received from the other wireless communication device, and;

communicating movement information, which is related to the moving path of the mobile object, with the other wireless communication device; and calculating distances between wireless communication devices that are dependent on the number of times of movement in the moving path by referring to the calculated moving path and movement information received from the other wireless communication device.

\* \* \* \* \*